(12) United States Patent
Yoon et al.

(10) Patent No.: US 9,127,727 B2
(45) Date of Patent: Sep. 8, 2015

(54) METHOD OF SEARCHING FOR SYNC START IN AUTOMATED MANUAL TRANSMISSION

(71) Applicants: Hyundai Motor Company, Seoul (KR); Kia Motors Corp., Seoul (KR)

(72) Inventors: Young Min Yoon, Seoul (KR); Hyun Cheol Hwang, Seoul (KR)

(73) Assignees: HYUNDAI MOTOR COMPANY, Seoul (KR); KIA MOTORS CORP., Seoul (KR)

(*) Notice: Subject to any disclaimer, the term of this patent is extended or adjusted under 35 U.S.C. 154(b) by 0 days.

(21) Appl. No.: 13/799,124

(22) Filed: Mar. 13, 2013

(65) Prior Publication Data
US 2014/0163829 A1  Jun. 12, 2014

(30) Foreign Application Priority Data

Dec. 11, 2012 (KR) .................... 10-2012-0143675

(51) Int. Cl.
*F16D 48/06* (2006.01)
*F16H 61/28* (2006.01)
*F16H 59/46* (2006.01)

(52) U.S. Cl.
CPC ............ *F16D 48/06* (2013.01); *F16H 61/28* (2013.01); *F16H 2059/462* (2013.01); *F16H 2061/2823* (2013.01); *F16H 2342/042* (2013.01)

(58) Field of Classification Search
None
See application file for complete search history.

(56) References Cited

U.S. PATENT DOCUMENTS

| | | | |
|---|---|---|---|
| 4,708,227 A * | 11/1987 | Kitade ...................... | 477/171 |
| 5,249,474 A * | 10/1993 | Gregory .................... | 74/15.66 |
| 6,591,705 B1 * | 7/2003 | Reik et al. ................ | 74/343 |
| 6,792,821 B1 * | 9/2004 | Yamamoto ................ | 74/335 |
| 2004/0112171 A1 * | 6/2004 | Kuhstrebe et al. ........ | 74/730.1 |
| 2004/0121873 A1 * | 6/2004 | Bansbach et al. ......... | 475/198 |
| 2005/0204840 A1 * | 9/2005 | Soeda ....................... | 74/330 |
| 2010/0029438 A1 * | 2/2010 | Kobayashi et al. ....... | 477/124 |
| 2010/0322547 A1 * | 12/2010 | Matsushita et al. ...... | 384/548 |
| 2011/0295475 A1 * | 12/2011 | Shimizu et al. .......... | 701/66 |

FOREIGN PATENT DOCUMENTS

| | | |
|---|---|---|
| JP | 2002-48225 A | 2/2002 |
| JP | 2002-71016 A | 3/2002 |
| JP | 2011-231861 A | 11/2011 |
| KR | 1020120038797 A | 4/2012 |

* cited by examiner

*Primary Examiner* — John R Olszewski
*Assistant Examiner* — Nicholas K Wiltey
(74) *Attorney, Agent, or Firm* — Morgan, Lewis & Bockius LLP

(57) ABSTRACT

A method of searching for a sync start in an automated manual transmission, may include a slip preparing step of operating, in a parked position, a sleeve and a clutch restrained so as not to rotate into a slip state, an actuator operating step of moving the sleeve toward a clutch gear from a neutral position, a clutch speed determination step of determining whether or not a speed of rotation of the clutch has decreased by the actuator operating step, a stop determination step of determining whether or not a movement of the sleeve that was driven by the actuator operating step has stopped, and a first position determination step of determining a point where the clutch speed determination step determines that the speed of the rotation of the clutch has decreased and the stop determination step determines that the movement of the sleeve has stopped as the sync start.

12 Claims, 3 Drawing Sheets

METHOD OF SEARCHING FOR SYNC START IN AUTOMATED MANUAL TRANSMISSION

CROSS-REFERENCE TO RELATED APPLICATION

The present application claims priority to Korean Patent Application No. 10-2012-0143675, filed on Dec. 11, 2012, the entire contents of which is incorporated herein for all purposes by this reference.

BACKGROUND OF THE INVENTION

1. Field of the Invention

The present invention relates, in general, to a method of searching for a sync start in an automated manual transmission, and more particularly, to a technology for searching for a sync start, i.e. a point at which actual synchronization starts, when a shifting operation is carried out using an actuator in an automated manual transmission mechanism of the related art, such as a dual clutch transmission (DCT) or an automated manual transmission (AMT).

2. Description of Related Art

In a transmission mechanism using a manual transmission of the related art, when a shifting operation is started following a selecting operation, a sleeve in a neutral position linearly slides in the direction in which a target gear is positioned. At the same time, a key pushes a synchronizer ring so that the synchronizer ring abuts against a cone of a clutch gear, thereby starting synchronization. When the synchronization is completed, the sleeve meshes with the clutch gear through the synchronizer ring, thereby completing shifting to the target gear.

In an automated manual transmission, the above-described shifting operation is carried out by a shifting actuator. In order to satisfy conflicting requirements including rapid shifting response and smooth shifting sensation, the shifting operation using the shifting actuator is controlled such that the sleeve is moved as rapidly as possible before the sync start where the synchronizer ring starts adjoining the cone of the clutch gear, and afterwards, is moved slowly using as smooth a movement as possible until the synchronization is completed.

If the sync start is erroneously estimated, for example, if, in controlling the shifting actuator, the sync start is estimated to be a point that is too close to the neutral position, the sleeve must also be moved to the sync start, which increases a shifting time, thereby degrading the response. In contrast, when the sync start is estimated to be a point that is too far from the neutral position, a shifting impact occurs.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of searching for a sync start in an automated manual transmission in which a manual transmission mechanism is operated using an actuator. This method can accurately search for a sync start that acts as an important reference for the control in a shift operation so that the sync start can be used for the control of the actuator, which improves shifting response and reduces a shifting impact, thereby obtaining shifting quality in a reliable fashion.

In an aspect of the present invention, a method of searching for a sync start in an automated manual transmission, may include a slip preparing step of operating, in a parked position, a sleeve and a clutch which is restrained so as not to rotate into a slip state, an actuator operating step of moving the sleeve toward a clutch gear from a neutral position, a clutch speed determination step of determining whether or not a speed of rotation of the clutch may have decreased by the actuator operating step, a stop determination step of determining whether or not a movement of the sleeve that was driven by the actuator operating step may have stopped, and a first position determination step of determining a point where the clutch speed determination step determines that the speed of the rotation of the clutch may have decreased and the stop determination step determines that the movement of the sleeve may have stopped as the sync start.

In another aspect of the present invention, a method of searching for a sync start in an automated manual transmission, may include a slip preparing step of operating, in a parked position, a sleeve and a clutch which is restrained so as not to rotate, into a slip state, an actuator operating step of moving the sleeve toward a clutch gear from a neutral position, and a second position determination step of locating a point where a speed of rotation of the clutch is decreased at the actuator operating step and determining the point as the sync start.

In further another aspect of the present invention, a method of searching for a sync start in an automated manual transmission may include a slip preparing step of operating, in a parked position, a sleeve and a clutch which is restrained so as not to rotate, into a slip state, an actuator operating step of moving the sleeve toward a clutch gear from a neutral position, and a third position determination step of determining whether or not a movement of the sleeve by the actuator operating step may have stopped and determining a point where a movement of the sleeve by the actuator operating step may have stopped as the sync start.

In another aspect of the present invention, the actuator operating step may include limiting an operating force of a shifting actuator that moves the sleeve into a range that is not greater than a repulsive force that is caused by a synchronizer ring adjoining a cone of a clutch gear in response to the movement of the sleeve, wherein the actuator operating step may include gradually linearly increasing the operating force of the shifting actuator that moves the sleeve.

In further another aspect of the present invention, the method may further may include, before the actuator operating step, a braking step of restraining a rotation of driving wheels by operating a brake of an automobile.

According to an exemplary embodiment of the present invention, in the method of searching for a sync start in the automated manual transmission in which the manual transmission mechanism is operated using the actuator, the sync start that acts as an important reference for the control in a shift operation can be accurately searched for so that the sync start can be used for the control of the actuator, which improves shifting response and reduces a shifting impact, thereby obtaining shifting quality in a reliable fashion.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
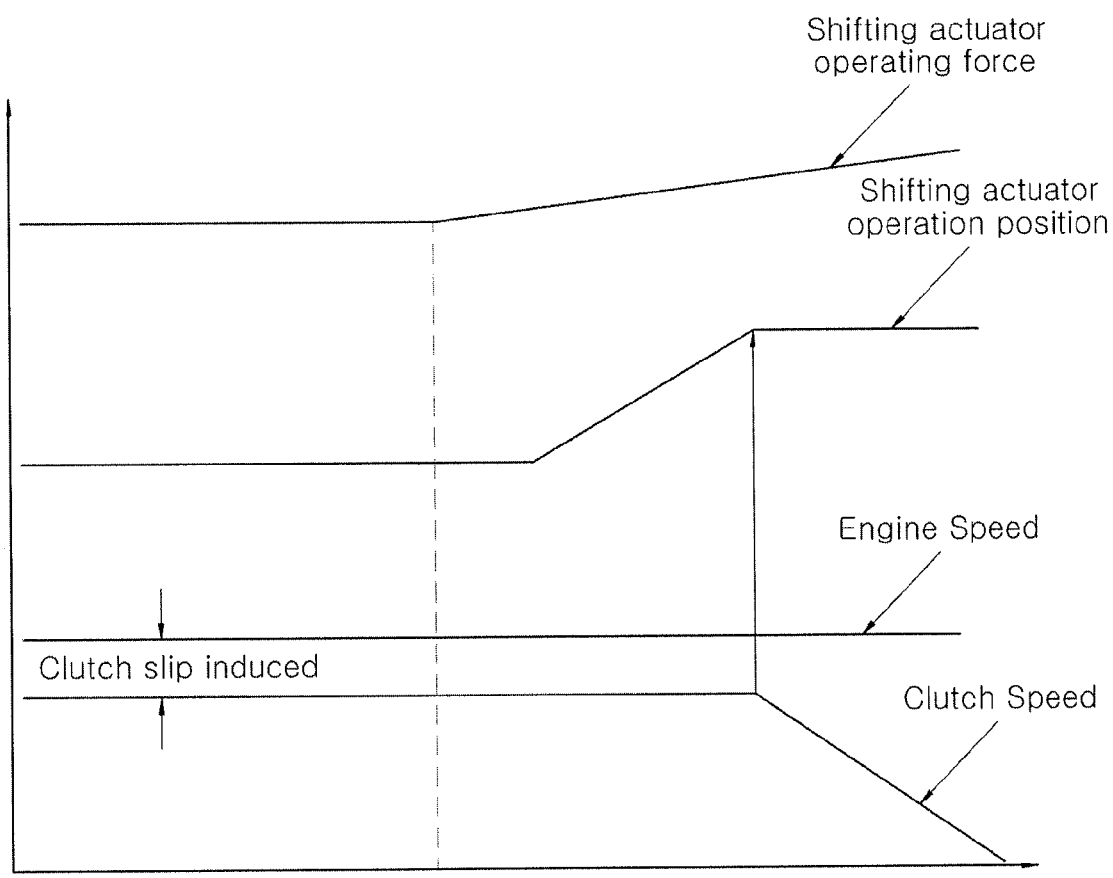
FIG. 1 is a graph showing the control concept of a method of searching for a sync start in an automated manual transmission according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in greater detail to a exemplary embodiment of the present invention, an example of which is illustrated in the accompanying drawings. Wherever possible, the same reference numerals will be used throughout the drawings and the description to refer to the same or like parts.

Figure 2:
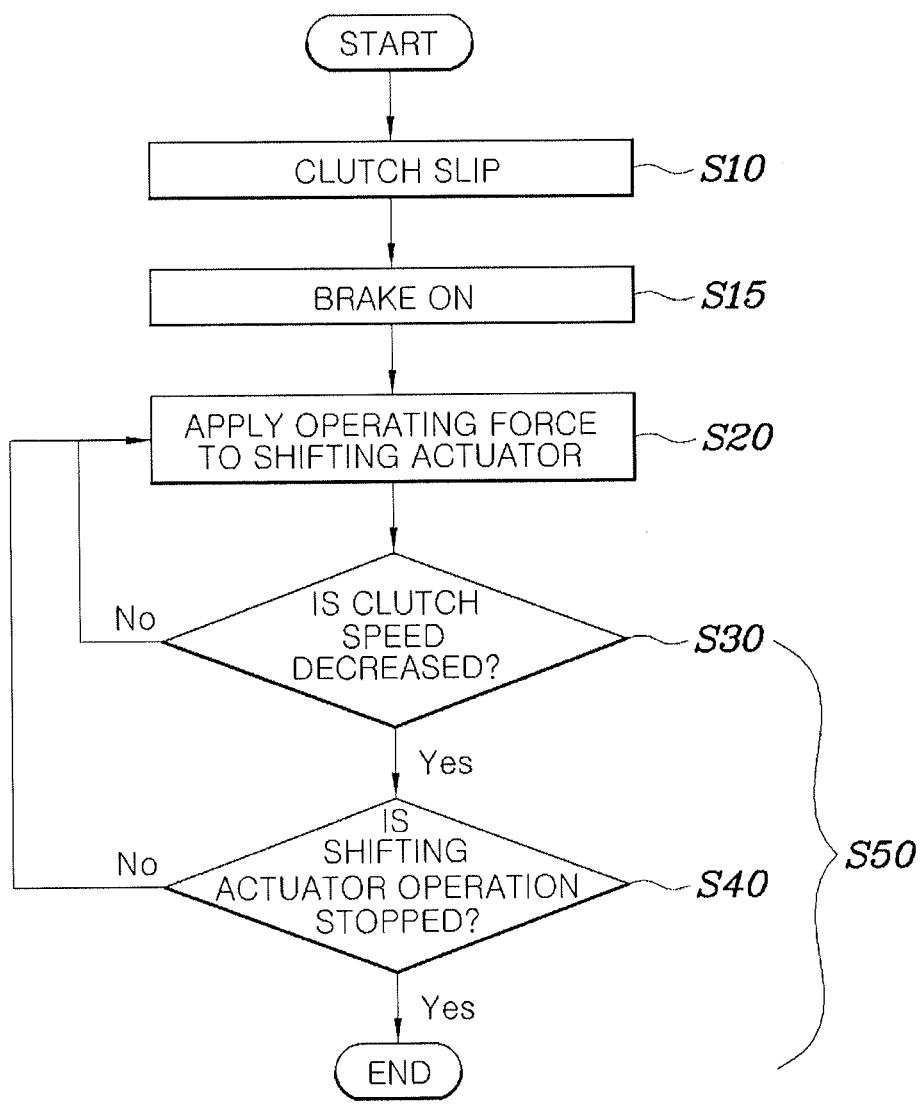
FIG. 2 is a flowchart showing an exemplary embodiment of the method of searching for a sync start in an automated manual transmission according to an exemplary embodiment of the present invention.
Figure 3:
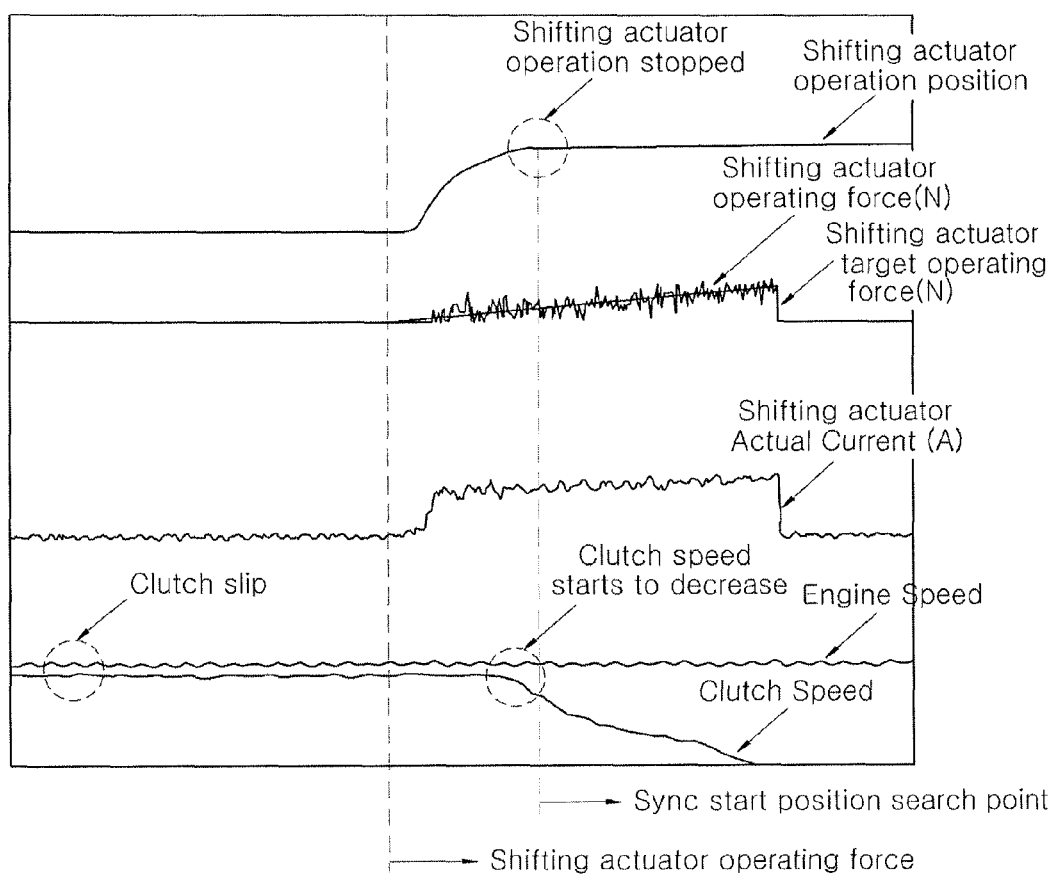
FIG. 3 is a graph showing the result obtained by applying the method of searching for a sync start in an automated manual transmission to an actual automobile.

Referring to FIG. 1 to FIG. 3, an exemplary embodiment of a method of searching for a sync start in an automated manual transmission according to an exemplary embodiment of the present invention includes a slip preparing step S10 of operating, in a parked position, a clutch which is restrained so as not to relatively rotate with a sleeve into a slip state, an actuator operating step S20 of moving the sleeve toward a clutch gear from a neutral position, a clutch speed determination step S30 of determining whether or not the speed of rotation of the clutch has been decreased by the actuator operating step S20, a stop determination step S40 of determining whether or not the movement of the sleeve that was driven by the actuator operating step S20 has stopped, a first position determination step S50 of determining a point where the clutch speed determination step S40 determines that the speed of rotation of the clutch has decreased and the stop determination step S40 determines that the movement of the sleeve has stopped as a sync start.

When the clutch is operated into the slip state in the parked position, an input shaft connected to the clutch and the sleeve connected to the input shaft are rotated to a predetermined degree along with the clutch. However, since it is in the parked position, the clutch gear with which the sleeve is to engage does not rotate. Consequently, a difference in the speed of rotation occurs between the sleeve and the clutch gear. When the sleeve in this state is moved toward the clutch gear at the actuator operating step S20, the synchronizer ring starts abutting against a cone of the clutch gear. Consequently, the speeds of rotation of the sleeve, the input shaft and the clutch are decreased due to a repulsive force generated by the clutch gear. In addition, the sleeve stops moving. Accordingly, this point of time is determined as the sync start.

For reference, in the figures, the movement of the sleeve is expressed by the operating position of the shifting actuator.

In addition, an exemplary embodiment of the present invention may include the slip preparing step S10 of operating, in the parked position, the sleeve and the clutch, which is restrained so as not to rotate, into the slip state, the actuator operating step S20 of moving the sleeve toward the clutch gear from the neutral position, a second position determination step of locating a point where the speed of rotation of the clutch is decreased at the actuator operating step S20 and determining the point as the sync start.

In addition, an exemplary embodiment of the present invention may include the slip preparing step S10 of operating, in the parked position, the sleeve and the clutch, which is restrained so as not to rotate, into the slip state, the actuator operating step S20 of moving the sleeve toward the clutch gear from the neutral position, a third position determination step of determining whether or not the movement of the sleeve by the actuator operating step S20 has stopped and determining the point where the movement of the sleeve by the actuator operating step S20 has stopped as the sync start.

In these embodiments, the second position determination step and the third position determination step are different from the first position determination step S50. The first position determination step S50 can be substantially realized when the second position determination step and the third position determination step are combined in the AND condition. This indicates that, although the position of the sync start can be detected by carrying out only the second position determination step or only the third position determination step, the sync start can be more accurately and reliably searched for by determining whether or not both of the two conditions are satisfied based on the first position determination step S50.

At the actuator operating step S20, it is preferred that the operating force of the shifting actuator that moves the sleeve be limited to the range that is not greater than the repulsive force that is caused by the synchronizer ring adjoining the cone of the clutch gear in response to the movement of the sleeve.

In addition, at the actuator operating step S20, it is preferred that the operating force of the shifting actuator that moves the sleeve be gradually linearly increased.

It is preferred that the method further include, before the actuator operating step S20, a braking step S15 of restraining the rotation of driving wheels by operating a brake of the automobile in order to achieve more reliable braking state of the driving wheels.

For reference, in FIG. 1 and FIG. 2, as the operating force of the shifting actuator is gradually increased, the movement of the sleeve, that is, the operating position of the shifting actuator, changes, and then stops, and the speed of the clutch starts to decrease. This position is determined as a point where a new sync start is detected.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of searching for a sync start in an automated manual transmission, comprising:
   a slip preparing step of operating, in a parked position, a clutch which is restrained so as not to relatively rotate with a sleeve into a slip state, while an engine speed is higher than a rotation speed of the clutch;
   an actuator operating step of moving the sleeve toward a clutch gear from a neutral position;
   a clutch speed determination step of determining whether or not the rotation speed of the clutch has decreased by the actuator operating step;
   a stop determination step of determining whether or not a movement of the sleeve that was driven by the actuator operating step has stopped; and
   a first position determination step of determining a point where the clutch speed determination step determines that the rotation speed of the clutch has decreased and where the stop determination step determines that the movement of the sleeve has stopped simultaneously in the parked position and the slip state of the clutch, as the sync start.

2. The method of claim 1, wherein the actuator operating step includes limiting an operating force of a shifting actuator that moves the sleeve into a range that is not greater than a repulsive force that is caused by a synchronizer ring adjoining a cone of a clutch gear in response to the movement of the sleeve.

3. The method of claim 2, wherein the actuator operating step includes gradually linearly increasing the operating force of a shifting actuator that moves the sleeve.

4. The method of claim 1, further including, before the actuator operating step, a braking step of restraining a rotation of driving wheels by operating a brake of an automobile.

5. A method of searching for a sync start in an automated manual transmission, comprising:
   a slip preparing step of operating, in a parked position, a clutch which is restrained so as not to relatively rotate with a sleeve into a slip state, wherein an engine speed is higher than a rotation speed of the clutch;
   an actuator operating step of moving the sleeve toward a clutch gear from a neutral position; and
   a first position determination step of locating a point where the rotation speed of the clutch is decreased at the actuator operating step in the parked position and the slip state of the clutch and determining the point as the sync start.

6. The method of claim 5, wherein the actuator operating step includes limiting an operating force of a shifting actuator that moves the sleeve into a range that is not greater than a repulsive force that is caused by a synchronizer ring adjoining a cone of a clutch gear in response to a movement of the sleeve.

7. The method of claim 6, wherein the actuator operating step includes gradually linearly increasing the operating force of the shifting actuator that moves the sleeve.

8. The method of claim 7, further including, before the actuator operating step, a braking step of restraining a rotation of driving wheels by operating a brake of an automobile.

9. A method of searching for a sync start in an automated manual transmission, comprising:
   a slip preparing step of operating, in a parked position, a clutch which is restrained so as not to relatively rotate with a sleeve into a slip state, wherein an engine speed is higher than a rotation speed of the clutch;
   an actuator operating step of moving the sleeve toward a clutch gear from a neutral position;
   a third position determination step of determining whether or not a movement of the sleeve by the actuator operating step has stopped; and
   a first position determination step of determining a point where the rotation speed of the clutch has decreased and where a movement of the sleeve by the actuator operating step has stopped simultaneously in the parked position and the slip state of the clutch, as the sync start.

10. The method of claim 9, wherein the actuator operating step includes limiting an operating force of a shifting actuator that moves the sleeve into a range that is not greater than a repulsive force that is caused by a synchronizer ring adjoining a cone of a clutch gear in response to the movement of the sleeve.

11. The method of claim 10, wherein the actuator operating step includes gradually linearly increasing the operating force of the shifting actuator that moves the sleeve.

12. The method of claim 9, further including, before the actuator operating step, a braking step of restraining a rotation of driving wheels by operating a brake of an automobile.

* * * * *